US010783234B2

(12) United States Patent
D'Agostino et al.

(10) Patent No.: US 10,783,234 B2
(45) Date of Patent: Sep. 22, 2020

(54) SYSTEMS FOR ENABLING TOKENIZED WEARABLE DEVICES

(71) Applicant: The Toronto-Dominion Bank, Toronto (CA)

(72) Inventors: Dino Paul D'Agostino, Richmond Hill (CA); Perry Aaron Jones Haldenby, Toronto (CA); Dean C. N. Tseretopoulos, Toronto (CA); Jeffrey Aaron Ecker, North York (CA); Adam Douglas McPhee, Toronto (CA); Milos Dunjic, Oakville (CA); John Jong Suk Lee, Toronto (CA); Arun Victor Jagga, Toronto (CA)

(73) Assignee: The Toronto-Dominion Bank, Toronto, Ontario (CA)

( * ) Notice: Subject to any disclaimer, the term of this patent is extended or adjusted under 35 U.S.C. 154(b) by 343 days.

(21) Appl. No.: 15/946,911

(22) Filed: Apr. 6, 2018

(65) Prior Publication Data
US 2019/0311109 A1 Oct. 10, 2019

(51) Int. Cl.
*G06F 21/44* (2013.01)
*G06K 19/077* (2006.01)
*G06Q 20/32* (2012.01)

(52) U.S. Cl.
CPC ....... *G06F 21/44* (2013.01); *G06K 19/07762* (2013.01); *G06Q 20/3278* (2013.01)

(58) Field of Classification Search
CPC .............. G06F 21/44; G06K 19/07762; G06Q 20/3278; G06Q 20/38215; G06Q 20/327; H04L 63/0853; H04L 9/3213
See application file for complete search history.

(56) References Cited

U.S. PATENT DOCUMENTS 8,371,501 B1 2/2013 Hopkins
8,500,031 B2 8/2013 Naelon
(Continued)

OTHER PUBLICATIONS

STMicroelectronics Teams with Mobile-Payment Partners to Create Turnkey, Certification-Ready Solution for Wearable Devices; "Jan. 4, 2017globenewswire.comURL: https://globenewswire.com/news-release/2017/01/049/9032932/0/en/STMicroelectronics-Teams-with-Mobile-Payment-Partners-to-Create-Turnkey-Certification-Ready-Solution-for-Wearable-Device.html".
(Continued)

*Primary Examiner* — Techane Gergiso
(74) *Attorney, Agent, or Firm* — Rowand LLP

(57) ABSTRACT

A method for authenticating a wearable device is disclosed. The method includes: receiving, a signal representing an indication that the wearable device is in active use; in response to receiving the signal, updating a device database to associate a first status with the wearable device; receiving, from a tokenization service provider (TSP), a signal representing a first code derived by the TSP from decrypting a security token previously provisioned in the wearable device, wherein the security token was received at a terminal from the wearable device and transmitted to the TSP; obtaining, based on the received first code, a device identifier of the wearable device and an identifier of an account; querying the device database to verify that the wearable device is associated with the first status; verifying that the account is enabled for an operation initiated using the wearable device; and transmitting an authorization message to the terminal, the authorization message authorizing the operation.

22 Claims, 6 Drawing Sheets

(56) References Cited

U.S. PATENT DOCUMENTS

| | | | |
|---|---|---|---|
| 9,262,759 | B2 | 2/2016 | Hanson et al. |
| 9,576,285 | B2 | 2/2017 | Zhou |
| 9,589,264 | B2 | 3/2017 | Deliwala et al. |
| 2012/0016793 | A1 | 1/2012 | Peters et al. |
| 2014/0249994 | A1 | 9/2014 | Proud |
| 2015/0039494 | A1 | 2/2015 | Sinton et al. |
| 2015/0109106 | A1 | 4/2015 | Gomez et al. |
| 2015/0220917 | A1* | 8/2015 | Aabye ............... G06Q 20/3278 705/64 |
| 2015/0312038 | A1* | 10/2015 | Palanisamy ............ G06F 21/33 713/155 |
| 2016/0034887 | A1 | 4/2016 | Lee |
| 2016/0283933 | A1 | 9/2016 | Orlando et al. |
| 2016/0335615 | A1 | 11/2016 | Kim et al. |
| 2017/0024713 | A1 | 1/2017 | May et al. |
| 2017/0083909 | A1* | 3/2017 | Mork ................... G06Q 20/385 |
| 2017/0116657 | A1 | 4/2017 | Oh et al. |
| 2017/0124445 | A1 | 5/2017 | Howard |
| 2017/0279798 | A1* | 9/2017 | Reynolds ............ H04L 63/0853 |
| 2017/0337542 | A1* | 11/2017 | Kim ....................... G06Q 20/10 |

OTHER PUBLICATIONS

Rian Boden, ABN Amro pilots wearable payments with select customers; "Jun. 23, 2017 URL: https://www.nfcworld.com/2017/06/23/353566/abn-amro-pilots-wearable-payments-with-select-customers/".

David Nield, Husain Sumra; The best wearable payment devices; Nov. 24, 2016; "wareable.com URL: https://www.wareable.com/wearable-tech/the-best-wearable-payment-devices-976".

* cited by examiner

SYSTEMS FOR ENABLING TOKENIZED WEARABLE DEVICES

TECHNICAL FIELD

The present disclosure relates to wearable devices and, in particular, to methods and systems for authorizing an operation initiated using a wearable device.

BACKGROUND

Wearable devices are becoming more pervasive. The portability and convenience of use of wearable devices make them suitable for various real-time applications, such as activity and health monitoring, media playback, navigation, treatment of sensory impairments, and communications and data synchronization with other electronic devices.

Wearable devices often have integrated components that allow for wireless peer-to-peer communications. For example, a wearable device may be outfitted with an integrated RFID or NFC chip and antenna for managing short-range radiofrequency communications. As a result, wearable devices may be configured for many functions traditionally served by mobile devices (e.g. smartphones) and credit/debit/smart cards, including contactless payment, proof-of-identity, and social networking. However, when a wearable device is used for external communication or data transfer, it may be exposed to third-party attacks, such as message injection and eavesdropping. Thus, it is desirable to increase the security of operations that can be performed using wearable devices.

In some instances, wearable devices may have limited capabilities, making provisioning of such devices difficult. For example, wearable devices may be equipped with short-range communication capabilities, such as near-field communication (NFC) capabilities, but may lack long-range communication capabilities, such as cellular technologies. In such circumstances, provisioning of such wearable devices for use with various services may be difficult.

Thus, there is a need for improved systems, methods, devices or servers which address one or more of the provisioning or security limitations of wearable technologies.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
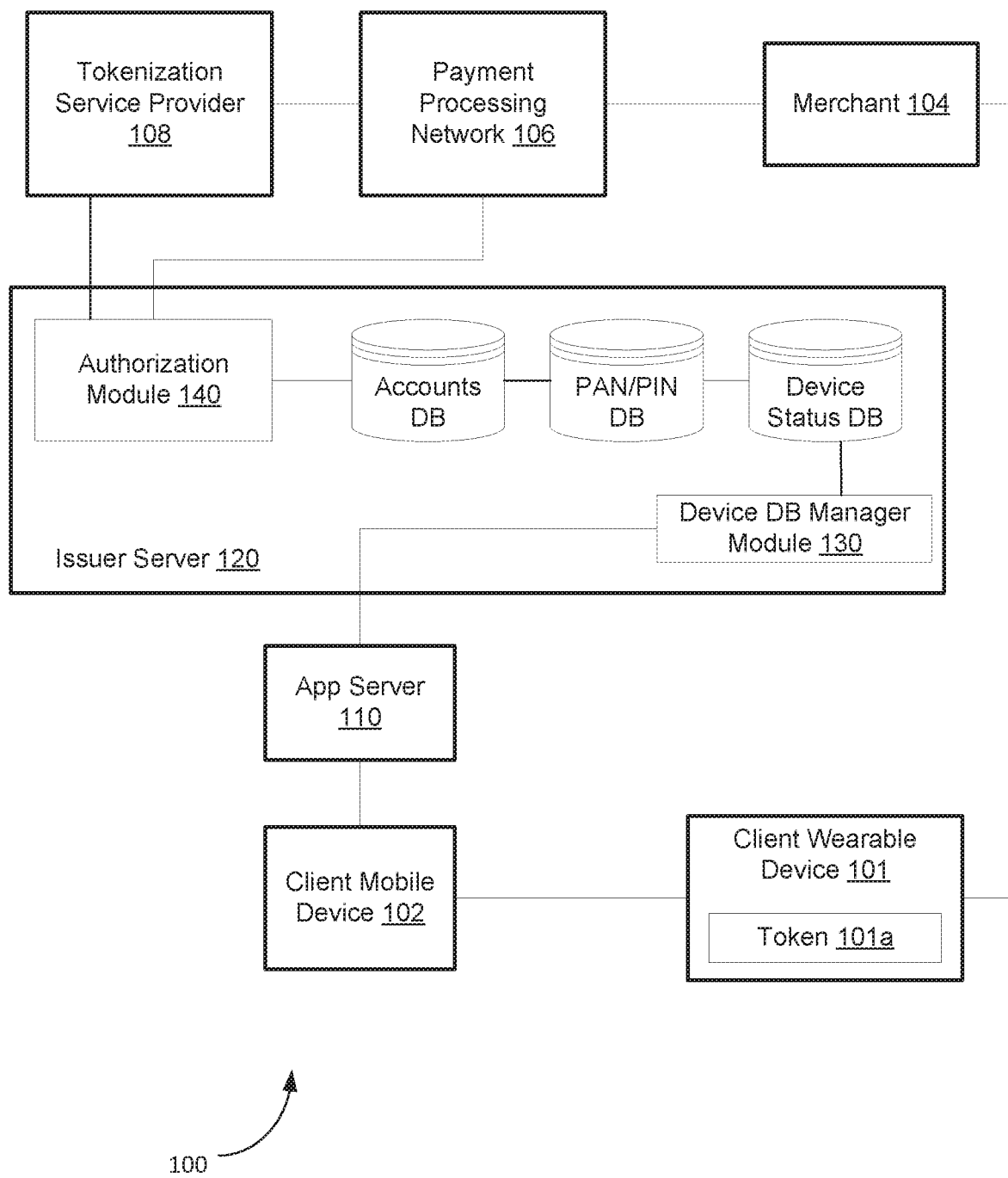
FIG. 1 is a schematic diagram illustrating an operating environment of an example embodiment.

In one aspect, the present disclosure describes a server. The server includes a communication module, memory, and a processor coupled to the memory and the communication module. The processor is configured to: receive, via the communication module, a signal representing an indication that a wearable device is in active use; in response to receiving the signal, update a device database to associate a first status with the wearable device; receive, via the communication module, a signal from a tokenization service provider (TSP) representing a first code derived by the TSP from decrypting a security token previously provisioned in the wearable device, wherein the security token was received at a terminal from the wearable device and transmitted to the TSP; obtain, based on the received signal representing the first code, a device identifier of the wearable device and an identifier of an account; query the device database to verify that the wearable device is associated with the first status; verify that the account is enabled for an operation initiated using the wearable device; and transmit, via the communication module, an authorization message to the terminal, the authorization message authorizing the operation.

In another aspect, the present disclosure describes a method for authenticating a wearable device. The method includes: receiving, a signal representing an indication that the wearable device is in active use; in response to receiving the signal, updating a device database to associate a first status with the wearable device; receiving, from a tokenization service provider (TSP), a signal representing a first code derived by the TSP from decrypting a security token previously provisioned in the wearable device, wherein the security token was received at a terminal from the wearable device and transmitted to the TSP; obtaining, based on the received signal representing the first code, a device identifier of the wearable device and an identifier of an account; querying the device database to verify that the wearable device is associated with the first status; verifying that the account is enabled for an operation initiated using the wearable device; and transmitting an authorization message to the terminal, the authorization message authorizing the operation.

In another aspect, the present disclosure describes a non-transitory computer readable storage medium comprising processor-executable instructions which, when executed, configure a processor to: receive, via the communication module, a signal representing an indication that a wearable device is in active use; in response to receiving the signal, update a device database to associate a first status with the wearable device; receive, via the communication module, a signal from a tokenization service provider (TSP) representing a first code derived by the TSP from decrypting a security token previously provisioned in the wearable device, wherein the security token was received at a terminal from the wearable device and transmitted to the TSP; obtain, based on the received signal representing the first code, a device identifier of the wearable device and an identifier of an account; query the device database to verify that the wearable device is associated with the first status; verify that the account is enabled for an operation initiated using the wearable device; and transmit, via the communication module, an authorization message to the terminal, the authorization message authorizing the operation.

In another aspect, the present disclosure describes a token registration system. The token registration system includes a communication module, memory, and a processor coupled to the memory and the communication module. The processor is configured to: transmit a request, to a tokenization service provider (TSP), to: i) generate a security token to be provisioned in a wearable device; and ii) set a primary account number (PAN) associated with the security token to a default value, the default value being associated with an de-authorized account, the de-authorized account configured to prevent performance of a database operation. The processor is further configured to: after the security token has been provisioned on the wearable device, receive a request, from a first electronic device that is different from the wearable device, to associate the security token with an authorized account, the request identifying a first PAN associated with the authorized account; and in response to receiving the user request, transmit a request, to the TSP, to update the PAN associated with the security token from the default value to the first PAN.

In another aspect, the present disclosure describes a method comprising: transmitting a request, to a tokenization service provider (TSP), to: i) generate a security token to be provisioned in a wearable device; and ii) set a primary account number (PAN) associated with the security token to a default value, the default value being associated with an de-authorized account, the de-authorized account configured to prevent performance of a database operation. The method further comprising: after the security token has been provisioned on the wearable device, receiving a request, from a first electronic device that is different from the wearable device, to associate the security token with an authorized account, the request identifying a first PAN associated with the authorized account; and in response to receiving the user request, transmitting a request, to the TSP, to update the PAN associated with the security token from the default value to the first PAN.

In another aspect, the present disclosure describes a non-transitory computer readable storage medium comprising processor-executable instructions which, when executed, configure a processor to: transmit a request, to a tokenization service provider (TSP), to: i) generate a security token to be provisioned in a wearable device; and ii) set a primary account number (PAN) associated with the security token to a default value, the default value being associated with an de-authorized account, the de-authorized account configured to prevent performance of a database operation. The processor is further configured to: after the security token has been provisioned on the wearable device, receive a request, from a first electronic device that is different from the wearable device, to associate the security token with an authorized account, the request identifying a first PAN associated with the authorized account; and in response to receiving the user request, transmit a request, to the TSP, to update the PAN associated with the security token from the default value to the first PAN.

Other example embodiments of the present disclosure will be apparent to those of ordinary skill in the art from a review of the following detailed descriptions in conjunction with the drawings.

The present disclosure provides a token based transaction authentication system. More specifically, embodiments of the present invention disclosed herein include systems and methods for authenticating transactional activities initiated using wearable devices. By activating security tokens that are pre-loaded into wearable devices, the present systems and methods can bolster the security of transactional activities that are undertaken using said wearable devices.

In the context of the present disclosure, "tokenization" refers to the technique of replacing a sensitive data element, such as account credentials, private records, and other personally identifiable information, with a non-sensitive equivalent, referred to as a "token". The token maps back to the sensitive data through a tokenization system that is administered by a token service provider (TSP). A TSP, which is an entity that is independent of the transaction processing network, facilitates the tokenization process, by assuming responsibility for providing registered token requesters (such as payment senders, merchants, etc.) with tokens. Such security tokens may only be used in a specific domain (e.g. a merchant's online website) or in predefined channels (e.g. NFC payment at a point-of-sale terminal). TSP's manage ongoing operation and maintenance of a token registry or vault, deployment of security controls, and registration of allowed token requesters.

In some embodiments, the active use of a wearable device may be used as a trigger for activating a token that is pre-provisioned in the wearable device. Various techniques for detecting active use of a wearable device may be employed. If a wearable device is determined to be in active use, a device database is updated to indicate that the wearable device is activated for one or more specific transactional activities. Once the wearable device is associated with the updated status, tokens that are transmitted from the wearable device for the one or more defined transactional activities will be deemed to be valid, thereby enabling the wearable device to be configured for performing the transactional activities using the tokenization and authentication schemes discussed herein. Thus, a token that is associated with a wearable device may only be used to initialize an operation if independent data (i.e., data apart from use of the token itself) indicates that the wearable device is, in fact, in use. If independent data does not suggest that the wearable device is in active use, the token associated with the wearable device may be effectively rendered inoperable. That is, if the independent data does not suggest that the wearable device is in use at the time when the token is in use (e.g., at a time when the token is received at a point-of-sale terminal), then an operation that would otherwise be performed or initiated (i.e., if the wearable device were indicated to be in use) is not performed or initiated.

In some embodiments, the present systems and methods may configure passive wearable devices, for use in transactional activities, in accordance with the security tokenization scheme described herein. Passive wearable devices are feature-limited devices. More particularly, passive wearable devices are wearables having limited communication capabilities. For example, a passive wearable device may include a short-range communication component, such as an NFC subsystem, but may not include a longer-range communication component; for example, a cellular subsystem may be excluded. Passive wearable devices may be pre-provisioned with "inactive" tokens that are associated with a default, "dummy" primary account number (PAN). The tokens may be remotely "activated". For example, an application that is loaded on a mobile electronic device, which may be connected to the wearable device, may be used to request a TSP to enable a token that was pre-provisioned on the wearable device for one or more defined transactional activities. In response, the TSP updates the PAN associated with the token from the default value to a different PAN for an account that is authorized for the defined transactional activities.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 shows a token-based transaction authentication system 100. The system 100 includes a client wearable device 101, a client mobile device 102, an app server 110, an issuer server 120, a merchant 104, a payment processing network 106, and tokenization service provider (TSP) 108. Although only one of each of client wearable device 101, client mobile device 102, merchant 104, payment processing network 106, and issuer server 120 are shown, there may be any suitable number of any of these entities in the system 100.

The client wearable device 101 may be any electronic device or articles (e.g. garments and accessories) having a wearable form factor. The client wearable device 101 is configured for short-range wireless communication. In some embodiments, the client wearable device 101 may be a smartwatch, fitness and health tracker, glasses, head-mounted displays (HMDs), ring, bracelet, stickers/tags, or garments outfitted with RFID and/or NFC capability. A security token 101a is pre-loaded in the client wearable device 101 (e.g., loaded onto the client wearable device 101 prior to purchase by a customer; for example, at the time of manufacture). The security token 101a is a unique identifier that is registered with an independent third-party authority, such as a TSP, and that is used as a substitute for one or more sensitive data elements.

The client wearable device 101 may be owned and operated by a user to conduct a secure operation, which may be, for example, a transactional activity, such as electronic payment, money transfer, or identity verification. The client wearable device 101 may be communicably coupled to the client mobile device 102, which may be a smartphone, tablet computer, personal digital assistant (PDA), or a computer system.

As used herein, a merchant 104 may refer to any suitable entity or entities that can conduct a transaction with the client. The merchant 104 may have a physical location, such as a point-of-sale terminal, where a sale may be made to the client. For example, the merchant 104 may be a logical representation of a computer or system of computers implementing a point-of-sale or other commercial outlet of a merchant.

The payment processing network 106 refers to a network of suitable entities that have information related to an account associated with the client wearable device 101. The payment processing network 106 may have or operate a server computer and may include a database. The database may include any hardware, software, firmware, or combination of the preceding for storing and facilitating retrieval of information. The database may use any of a variety of data structures, arrangements, and compilations to store and facilitate retrieval of information. The server computer may be coupled to the database and may include any hardware, software, other logic, or combination of the preceding for servicing the requests from one or more client computers. The server computer may use any of a variety of computing structures, arrangements, and compilations for servicing the requests from one or more client computers.

The payment processing network 106 may include data processing subsystems, networks, and operations used to support and deliver authorization services, exception file services, and clearing and settlement services. An exemplary payment processing network may include VisaNet™. Networks that include VisaNet™ are able to process credit and debit card transactions, and other types of commercial transactions. VisaNet™ includes a VIP system (Visa Integrated Payments system) which processes authorization requests and a Base II system which performs clearing and settlement services. The payment processing network 106 may use any suitable wired or wireless network, such as the Internet.

The issuer server 120 comprises one or more computer systems belonging to an issuer. An issuer is any suitable entity that may open and maintain an account associated with the client and/or client wearable device 101. For example, an issuer may be a financial institution (e.g. a bank), a business entity such as a retail store, or a governmental organization. In at least some embodiments, the issuer server 120 includes an authorization module 140 and a device database manager module 130. The authorization module 140 may be configured for parsing transaction codes associated with one or more payment transactions and verifying/authorizing payment transactions. The device database manager module 130 is an interface with a device status database, which stores device information for one or more devices that are authorized for conducting payment transactions through accounts managed by the issuer. The issuer server 120 may further store and maintain an accounts database and a primary account number (PAN) database for accounts managed by the issuer.

The client wearable device 102 is in communication with the merchant 104. In an example embodiment, the merchant 104 may operate a point-of-sale terminal. The client wearable device 102 may communicate with the merchant 104 via a short-range communication technology, such as Wi-Fi, RFID, NFC, or Bluetooth, or another communications network. The wearable device 102 may communicate with the merchant 104 to, for example, transmit a security token in order to effect a permissible transactional activity, and to receive a confirmation of success upon the authentication and/or completion of the transactional activity.

The merchant 104 and the issuer server 120 are in communication with the payment processing network 106. The merchant 104 may forward payment transaction details and one or more security tokens associated with client wearable device 102 to the payment processing network for authorization. The payment processing network 106 may communicate with the issuer server 120 to, for example, verify that the client wearable device 102 successfully authenticated with the issuer. The payment processing network 106 may send account funding transaction/original credit transaction messages to the issuer server 120 and the merchant's bank in order to effectuate a transfer of value between records in one or more databases. The payment processing network 106 may also send debit and deposit messages to the issuer server 120 and the merchant's bank to effectuate a credit/debit card transaction.

The client wearable device 102 may also communicate with the payment processing network 106. The client wearable device 102 may communicate with the payment processing network 106 after the authentication process to conduct a transaction, and may also communicate with the payment processing network 106 before the authentication to register/enroll for the authentication services. In an example embodiment, the client wearable device 102 may communicate with the payment processing networking 106 during the authentication process to provide and receive authentication data.

The merchant 104 may also communicate with the issuer server 120. In an example embodiment, the merchant 104 may receive the status of an authentication request from the issuer server 120.

Communications between entities in the token-based transaction authentication system 100 may be conducted via the web, a mobile network, an intranet, SMS/IVR, email, APIs, tailored messages, a specialized application, or a communications network.

Figure 2:
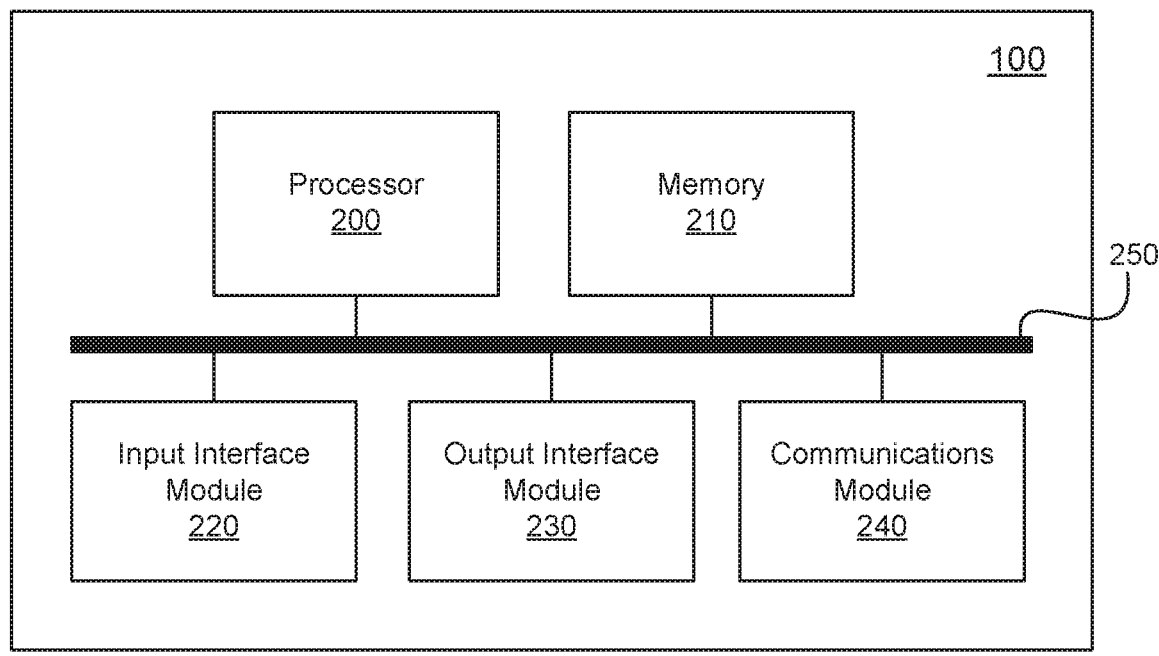
FIG. 2 is a high-level operation diagram of an example computing device.

FIG. 2 is a high-level operation diagram of the client mobile device 102. The client mobile device 102 includes a variety of modules. For example, as illustrated, the client mobile device 102 may include a processor 210, a memory 220, a communications module 230, and a storage module 240. As illustrated, the foregoing example modules of the client mobile device 102 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the client mobile device 102.

The communications module 230 allows the client mobile device 102 to communicate with other computing devices and/or various communications networks. For example, the communications module 230 may allow the client mobile device 102 to send or receive communications signals. Communications signals may be sent or received according to one or more protocols or according to one or more standards. For example, the communications module 230 may allow the client mobile device 102 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the client mobile device 102 to communicate using NFC, via Wi-Fi, using Bluetooth or via some combination of one or more networks or protocols. In some embodiments, all or a portion of the communications module 230 may be integrated into a component of the client mobile device 102. For example, the communications module may be integrated into a communications chipset.

The storage module 240 allows the client mobile device 102 to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
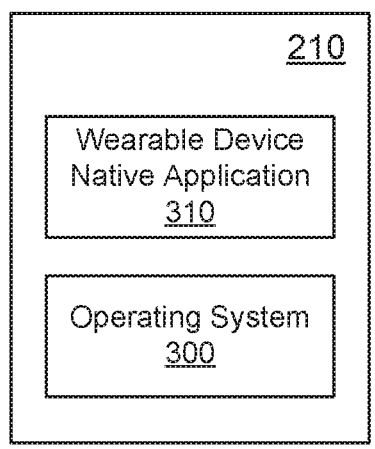
FIG. 3 depicts an example simplified software organization of the example computing device of FIG. 2.

FIG. 3 depicts a simplified organization of software components stored in the memory 220 of the client mobile device 102. As illustrated, these software components include an operating system 300 and a wearable device native application 310.

The operating system 300 is software. The operating system 300 allows the application 310 to access the processor 210, the memory 220, and the communications module 230. The operating system 300 may be, for example, UNIX™, Linux™, Microsoft™ Windows™, Apple OSX™ or the like.

Figure 4:
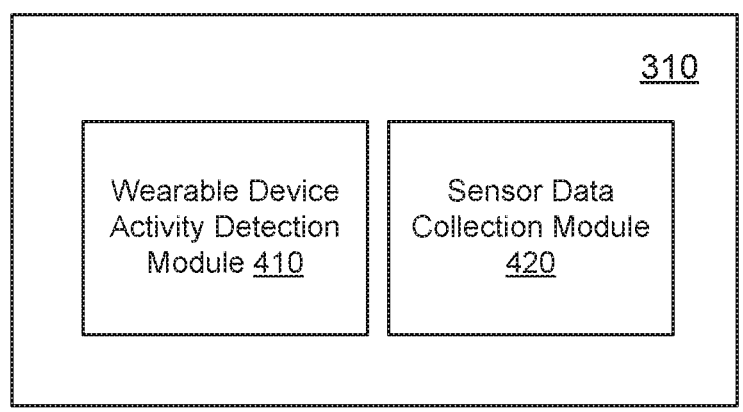
FIG. 4 depicts a simplified organization of software modules exemplary of an embodiment of a wearable device native application.

The wearable device native application 310 adapts the client mobile device 102, in combination with the operating system 300, to operate as a device for one or more particular functions. In particular, the application 310 manages the interaction between the client wearable device 101 and the client mobile device 102. As shown in FIG. 4, the application 310 may include a wearable device activity detection module 410 and a sensor data collection module 420. The application 310 provides a client the ability to control the interaction with the client wearable device 101, including monitoring for activity associated with the client wearable device 101, accumulating and analyzing sensor data indicative of activity of the client wearable device 101, and requesting (to one or more of the issuer server 120 and TSP 108) for registration of the client wearable device 101 and one or more tokens associated therewith. In particular, the application 310 may implement a user interface for managing the interaction between the client mobile device 102 and the client wearable device 101.

Figure 5:
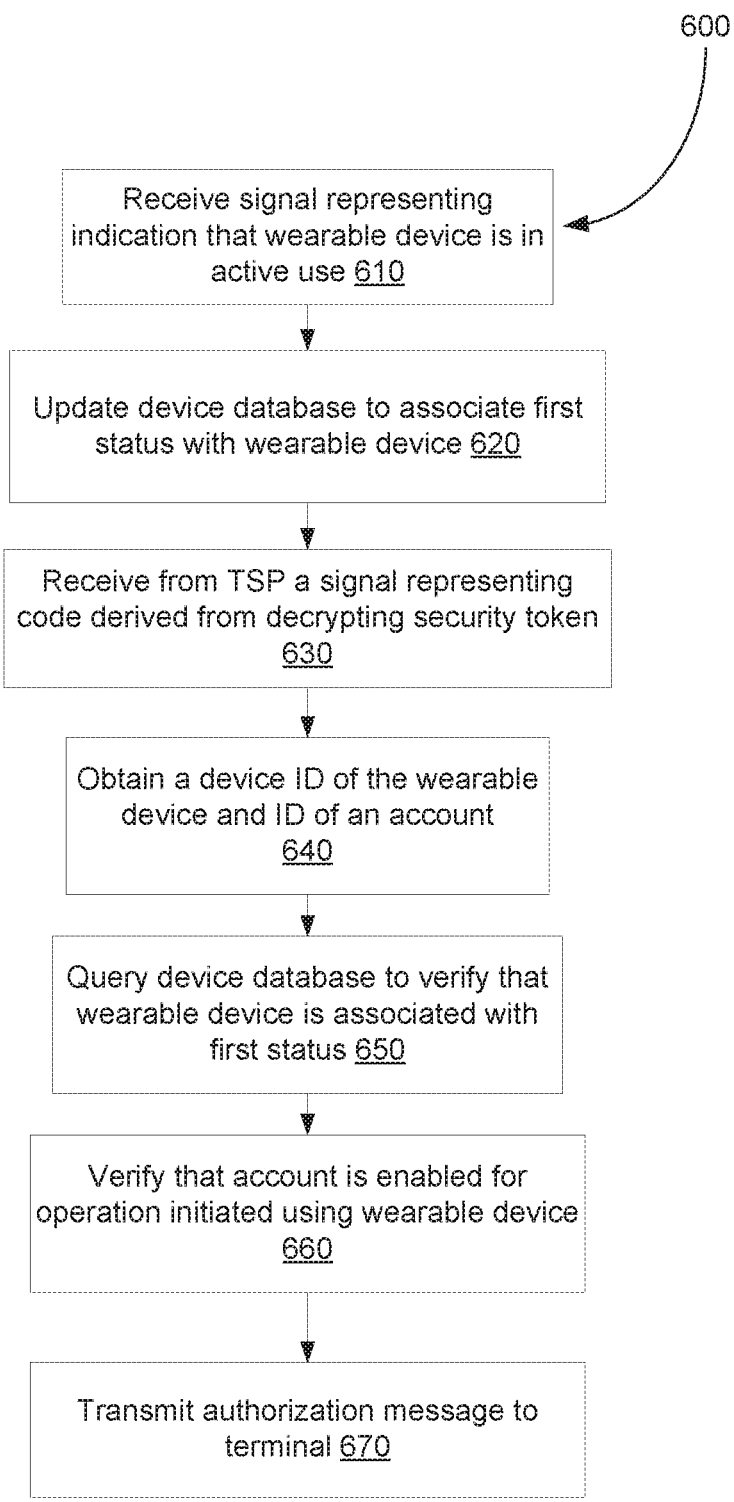
FIG. 5 is a flowchart of an exemplary method for authenticating a wearable device, in accordance with example embodiments of the present disclosure.
Figure 7:
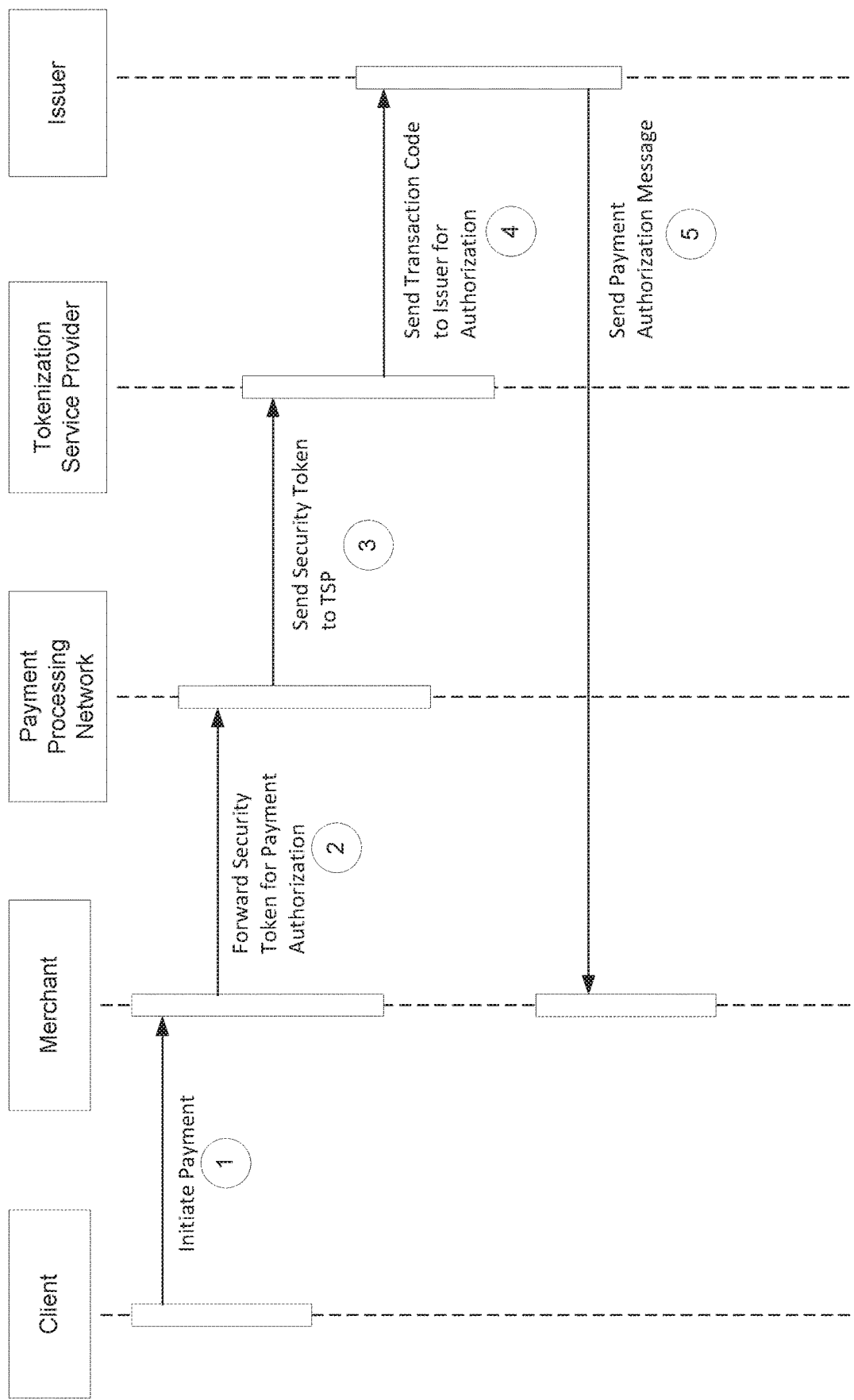
FIG. 7 is a sequence diagram illustrating an exemplary process for authenticating a transaction initiated using a wearable device, in accordance with example embodiments of the present disclosure.

Reference is now made to FIG. 5, which is a flowchart of an exemplary method 600 for real-time authentication of a wearable device, and FIG. 7, which is a sequence diagram illustrating an exemplary process for authenticating a transaction initiated using a wearable device. In at least some embodiments, the method 600 may be implemented by a server associated with an authorizing entity. For example, the method 600 may be implemented by a server operated by a financial institution or similar entity positioned to authorize payment transactions associated with user accounts, such as issuer server 120.

In operation 610, the authorization server receives a signal representing an indication that the wearable device is in active use. For example, a client mobile device may monitor for signs that the wearable device is in active use. In some embodiments, the client mobile device may detect, based on sensor data collected by the mobile device and/or messages exchanged with the wearable device, that the wearable device is in motion. The mobile device may then determine that the wearable device is in active use. As another example, the wearable device may be configured to broadcast a signal that is detectable by the client mobile device when the wearable device is in active use. The wearable device itself may include on-board sensors (e.g. motion sensor) or a geo-locator that would be able to detect that the wearable device is in motion or active use. For example, specific types of interactions such as predefined gestures and movements of the wearable device may be detected as signaling active use. In some embodiments, the wearable device may receive direct user input which may indicate that the wearable device is in active use. For example, the wearable device may include a built-in switch that a user can manually control for indicating active device use status. As another example, the wearable device may receive biometric data identifying a particular user and determine that the wearable device is in active use upon recognizing the user as an individual authorized for using the wearable device.

When active use of the wearable device is detected, the client mobile device or the wearable device may be configured to transmit a message to the authorization server signaling the wearable device's active use.

In operation 620, the authorization server updates a device database to associate a first status with the wearable device. In some embodiments, the authorization server may itself maintain a device database associated with accounts maintained by the issuer. For example, the authorization server may contain a device database manager module which interfaces with a device database for updating one or more statuses for registered devices (wearable or otherwise) associated with user accounts. The device database may maintain, for one or more registered devices, the following information (without limitation): permissible transaction activities (e.g. permitted transaction types, amounts, etc.), linked accounts, registration and expiry dates (including expiry dates of any security tokens), transaction activity history, and active or non-active status.

In some embodiments, the device database may not be stored at the authorization server. For example, the device database may be located at a remote TSP server. The authorization server may transmit a request to the remote authority/entity maintaining the device database to update the status associated with the wearable device.

In operation 630, the authorization server receives, from a TSP, a signal representing a first code derived by the TSP from decrypting a security token previously provisioned in the wearable device. If the wearable device is used for conducting a transactional activity, a security token pre-loaded on the wearable device may be used to bolster the security of the transaction. In particular, the wearable device may implement, in conjunction with a TSP, a tokenization scheme which provisions the wearable device with a unique token. A client may initiate a transaction (e.g. at a merchant point-of-sale terminal) using the wearable device (operation 1 of FIG. 7). The token associated with the wearable device is first transmitted to the merchant terminal (operation 2 of FIG. 7), and subsequently forwarded to a TSP (operation 3 of FIG. 7). The TSP then decrypts the received token to derive a transaction code associated with the transaction. The TSP sends the transaction code to the authorization server (operation 4 of FIG. 7).

In operation 640, the authorization server obtains a device identifier of the wearable device and an identifier of a user account associated with the wearable device, based on the received transaction code. For example, the authorization server may receive, from the TSP, a PAN derived from the security token associated with the wearable device. In some embodiments, an authorization module of the authorization server may parse the transaction code received from the TSP to produce a user account identifier and a wearable device identifier.

In operation 650, the authorization server queries the device database to verify that the wearable device is associated with the first status. In particular, the authorization server checks to determine whether the wearable device is enabled for conducting the transaction that was requested by the client. This check may include, at least, confirming that the wearable device is associated with a status indicating active use of the wearable device in the device database.

In operation 660, the authorization server verifies that the user account associated with the account identifier is enabled for the operation (e.g. transactional activity) initiated using the wearable device. For example, an authorization module within the authorization server may cross-reference an accounts database and the device database to verify that the wearable device is enabled for the operation (e.g. electronic payment at a point-of-sale terminal) identified by the transaction code. The verification may include checking that the security token provisioned in the wearable device (which was transmitted to the merchant upon initiation of the transaction) is associated with a PAN corresponding to the user account.

Once the transaction is verified, the authorization server sends a message authorizing the operation to the merchant and/or merchant terminal, in operation 670 (operation 5 of FIG. 7). In particular, an authorization message may be transmitted to the merchant terminal after verifying that the wearable device is associated with the first status and that the user account is enabled for the operation initiated using the wearable device.

In some embodiments, the device database, whether stored at the authorization server, a TSP, or a different entity, may be updated to reflect the current activity status of the wearable device. For example, the authorization server may receive a signal representing an indication that the wearable device is no longer in active use. The wearable device may, for example, be out of battery, broken, turned off, or otherwise decommissioned. The authorization server may, in turn, update the device database to associate a second status (e.g. "inactive" status) with the wearable device. This dynamic updating of the device database may preclude unauthorized transactional activity conducted using wearable devices that are de-registered, de-commissioned, or otherwise identified as inactive.

Figure 6:
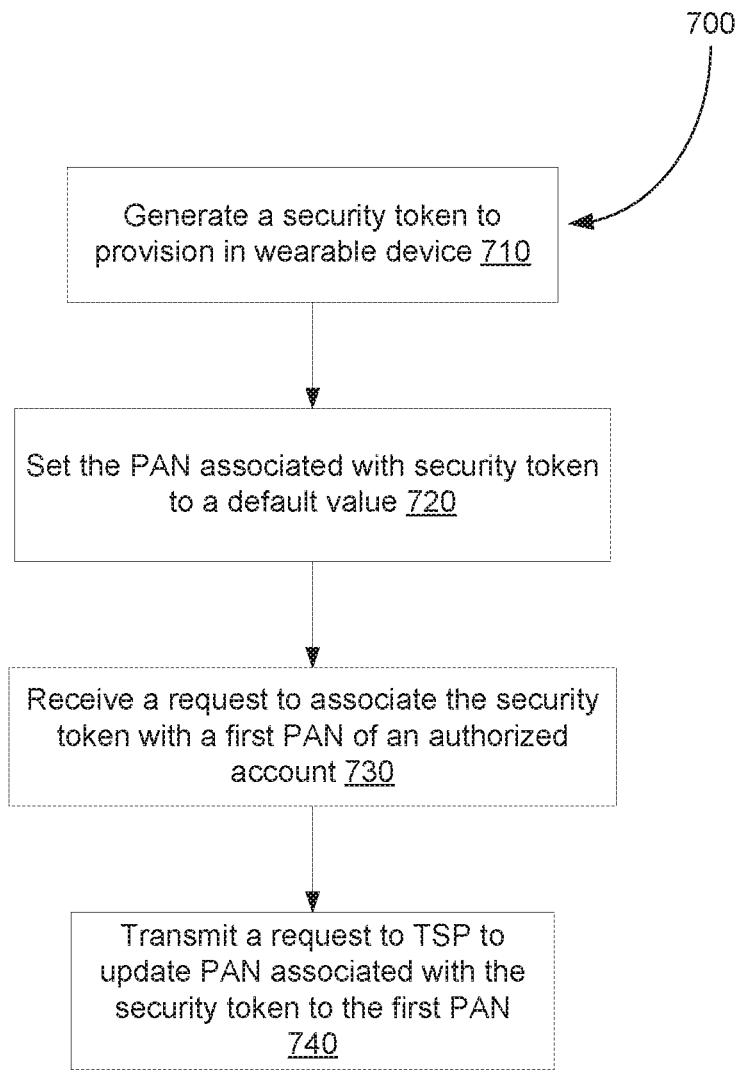
FIG. 6 is a flowchart of an exemplary method for registering a security token associated with a wearable device, in accordance with example embodiments of the present disclosure.

Reference is now made to FIG. 6, which is a flowchart of an exemplary method 700 for dynamically registering a security token associated with a wearable device. In at least some embodiments, the method 700 may be implemented by one or more processors associated with a token registration system that is administered by an authorization server, a TSP, or another entity with authority to manage ongoing operations and maintenance of token storage and token registration process. Alternatively, the method 700 may be performed by one or more computer systems associated with a personalization bureau, which assists an issuing/authorizing entity to personalize wearable devices (e.g. provisioning of security tokens) prior to sale or distribution.

The method 700 may be particularly suitable when activating passive wearable devices for conducting one or more transactional activities. For example, an issuing/authorizing entity may provide, to its customers, wearable devices or articles having wearable form factor (e.g. rings, bracelets, shirts having cuffs equipped with RFID/NFC functionality, etc.) which are not connected to other electronic devices and which are configured for short-range wireless communication (e.g. NFC).

In operation 710, a security token is generated for provisioning in a wearable device. A personalization bureau may perform this function, by "requesting" a token for each of one or more wearable devices that are to be issued/distributed. The PAN associated with the generated security token is set to a default value ("dummy issuer PAN") in operation 720. That is, at the time of requesting the token, the same default PAN value can be supplied to the TSP for all non-activated tokens. The default value is associated with a de-authorized account which is configured to prevent performance of defined database operations. For example, in at least some embodiments, the default value is associated with an account having no available credits. Credits may include, for example, an account balance or available credit.

In response to the submitted request, the personalization bureau receives a token from the TSP. The personalization bureau then provisions the wearable device with the received token and personalizes the wearable device with all of the required EMV keys. This way, the token in each issued and personalized wearable device is, by default, linked to the same "dummy issuer PAN", stored in the TSP, in its non-activated state. As a result, each such wearable device is issued as "inactive". As a consequence, and any transaction with a token that de-tokenizes to the default PAN can automatically be rejected. This mechanism thus allows for controlling the activation process for a token associated with an issued wearable device, without having to establish direct communication with the wearable device.

In at least some embodiments, since the dummy issuer PAN is a PAN that is associated with an account that has a balance that is zero (or less) and that has no available credit, any transaction that is attempted with a token that is associated with the dummy issuer PAN will be automatically denied. The denial of the transaction may occur using transaction evaluation software that is also used to evaluate transactions initiated using a token associated with an active PAN. For example, by simply using a PAN that is associated with no credits (e.g., that has a balance of zero or less and that has no available credit), a transaction initiated using the token that is associated with the dummy issuer PAN is evaluated in the same manner used to evaluate a transaction initiated using a token that is associated with an active PAN (i.e., a PAN that is not the dummy issuer PAN). For example, since the PAN is associated with zero credits, the PAN may automatically fail processing for any transaction that requires credits. The evaluation is the same as the evaluation used to evaluate other active PANs. For example, evaluation of an active PAN may involve a check to confirm that the available credits (i.e., balance and/or credit) associated with an account represented by the PAN are greater than or equal to an amount required for the transaction. Conveniently, this technique creates a processing efficiency which may reduce processing time and which may save memory as compared with techniques which deactivate a token using other techniques.

In operation 730, a request is received to associate the security token with an authorized account. In particular, the request identifies a first PAN associated with the authorized account. The user request may be received from a client mobile device, such as device 102 of FIG. 1. For example, a user request may be sent via a wearable device native application installed on a client mobile device. In at least some embodiments, the native application may authenticate the user by prompting the user to login to an authorized account with the issuing/authorizing entity. Once successfully logged in and authenticated by the issuer on the client mobile device, the user may be presented with options to request linking the security token associated with the wearable device to one of the user's accounts (e.g. real payment card PAN, or funding PAN).

In response to receiving such user request, a request is transmitted to the TSP to update the PAN associated with the security token from the default value to the first PAN, in operation 740.

In some embodiments, the token registration system may further receive from the TSP a message indicating that the PAN associated with the security token has been updated to the first PAN. The system may then transmit a message to the client mobile device that the wearable device is enabled for use in effecting one or more specific permitted transaction activities. The system may also be configured to update a device database to indicate that the token associated with the wearable device is activated for use in transactions.

In some embodiments, it may be desirable to deactivate a token associated with a wearable device. In such cases, the token registration system may receive a request to disassociate the security token of the wearable device from the authorized account. The system may then transmit a request to the TSP to switch the PAN associated with the security token from the PAN enabled for one or more transactions to the default "dummy" issuer PAN.

Techniques described herein make use of electronic devices that are able to process and/or transmit data in real-time or near real-time. For example, conveniently, techniques described herein allow for real-time evaluation and/or authentication of a token. By way of example, computing devices allow for instant evaluation of a transaction initiated at a point-of-sale terminal and allow for real-time analysis as to whether a wearable device associated with the token was in active use at the time when the transaction was initiated.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A server comprising:
   a communication module;
   a memory;
   a processor coupled to the memory and the communication module, wherein the processor is configured to:
   receive, via the communication module, a signal representing an indication that a wearable device is in active use;
   in response to receiving the signal, update a device database to associate a first status with the wearable device;

receive, via the communication module, a signal from a tokenization service provider (TSP) representing a first code derived by the TSP from decrypting a security token previously provisioned in the wearable device, wherein the security token was received at a terminal from the wearable device and transmitted to the TSP;

obtain, based on the received signal representing the first code, a device identifier of the wearable device and an identifier of an account;

query the device database to verify that the wearable device is associated with the first status;

verify that the account is enabled for an operation initiated using the wearable device; and transmit, via the communication module, an authorization message to the terminal, the authorization message authorizing the operation.

2. The server of claim 1, wherein the indication that the wearable device is in active use comprises an indication that the wearable device is in motion.

3. The server of claim 1, wherein updating the device database comprises transmitting a request to a remote server to update the device database.

4. The server of claim 1, wherein the obtaining comprises receiving, from the TSP, a primary account number (PAN) derived from the security token.

5. The server of claim 1, wherein verifying that the account is enabled for the operation initiated using the wearable device comprises checking that the security token provisioned in the wearable device is associated with a PAN corresponding to the account.

6. The server of claim 1, wherein the processor is further configured to:

receive an indication that the wearable device is no longer in active use; and update the device database to associate a second status with the wearable device.

7. The server of claim 1, wherein the first status indicates that the wearable device is enabled for use as a payment device and wherein the terminal is a point-of-sale terminal and the operation is a transaction.

8. The server of claim 1, wherein the authorization message is transmitted to the terminal after verifying that the wearable device is associated with the first status and that the account is enabled for the operation initiated using the wearable device.

9. A method for authenticating a wearable device, the method comprising:

receiving a signal representing an indication that the wearable device is in active use;

in response to receiving the signal, updating a device database to associate a first status with the wearable device;

receiving, from a tokenization service provider (TSP), a signal representing a first code derived by the TSP from decrypting a security token previously provisioned in the wearable device, wherein the security token was received at a terminal from the wearable device and transmitted to the TSP;

obtaining, based on the received signal representing the first code, a device identifier of the wearable device and an identifier of an account;

querying the device database to verify that the wearable device is associated with the first status;

verifying that the account is enabled for an operation initiated using the wearable device; and transmitting an authorization message to the terminal, the authorization message authorizing the operation.

10. The method of claim 9, wherein the indication that the wearable device is in active use comprises an indication that the wearable device is in motion.

11. The method of claim 9, wherein updating the device database comprises transmitting a request to a remote server to update the device database.

12. The method of claim 9, wherein the obtaining comprises receiving, from the TSP, a primary account number (PAN) derived from the security token.

13. The method of claim 9, wherein verifying that the account is enabled for the operation initiated using the wearable device comprises checking that the security token provisioned in the wearable device is associated with a PAN corresponding to the account.

14. The method of claim 9, further comprising:

receiving an indication that the wearable device is no longer in active use; and updating the device database to associate a second status with the wearable device.

15. The method of claim 9, wherein the first status indicates that the wearable device is enabled for use as a payment device and wherein the operation is a transaction.

16. The method of claim 9, wherein the authorization message is transmitted to the terminal after verifying that the wearable device is associated with the first status and that the account is enabled for the operation initiated using the wearable device.

17. A token registration system comprising:

a communication module;

memory;

a processor coupled to the memory and the communication module, wherein the processor is configured to:

transmit a request, to a tokenization service provider (TSP), to:

generate a security token to be provisioned in a wearable device; and set a primary account number (PAN) associated with the security token to a default value, the default value being associated with a de-authorized account, the de-authorized account configured to prevent performance of a database operation;

after the security token has been provisioned on the wearable device, receive a request, from a first electronic device that is different from the wearable device, to associate the security token with an authorized account, the request identifying a first PAN associated with the authorized account; and in response to receiving the request, transmit a request, to the TSP, to update the PAN associated with the security token from the default value to the first PAN.

18. The token registration system of claim 17, wherein the processor is further configured to receive and verify authentication data associated with the authorized account prior to transmitting the request to update the PAN associated with the security token.

19. The token registration system of claim 17, wherein the wearable device comprises a near-field communication (NFC)-enabled tag.

20. The token registration system of claim 17, wherein the processor is further configured to:

receive a request, from the first electronic device, to disassociate the security token from the authorized account; and transmit a request, to the TSP, to switch the PAN associated with the security token from the first PAN to the default value.

21. The token registration system of claim 20, wherein the processor is further configured to:
receive, from the TSP, a first message indicating that the PAN associated with the security token has been updated; and
transmit, to the first electronic device, a second message indicating that the wearable device is enabled for use.

22. The token registration system of claim 21, further comprising, in response to receiving the first message, updating a devices database to associate a first status with the wearable device.

* * * * *